United States Patent [19]
Demetri

[11] Patent Number: 6,148,602
[45] Date of Patent: Nov. 21, 2000

[54] SOLID-FUELED POWER GENERATION SYSTEM WITH CARBON DIOXIDE SEQUESTRATION AND METHOD THEREFOR

[75] Inventor: Elia Demetri, Woburn, Mass.

[73] Assignee: Norther Research & Engineering Corporation, Woburn, Mass.

[21] Appl. No.: 09/223,515

[22] Filed: Dec. 30, 1998

Related U.S. Application Data

[60] Provisional application No. 60/096,230, Aug. 12, 1998.

[51] Int. Cl.$^7$ .................................. F02G 3/00; F02C 7/00
[52] U.S. Cl. ...................... 60/39.05; 60/39.07; 60/39.12; 60/39.55
[58] Field of Search ................................ 60/39.05, 39.07, 60/39.12, 39.5, 39.511, 39.55

[56] References Cited

U.S. PATENT DOCUMENTS

| | | |
|---|---|---|
| 3,978,661 | 9/1976 | Cheng ..................................... 60/39.55 |
| 4,019,314 | 4/1977 | Springmann ........................... 60/39.12 |
| 4,187,672 | 2/1980 | Rasor . |
| 4,238,923 | 12/1980 | Waryasz . |
| 4,509,324 | 4/1985 | Urbach et al. ........................... 60/39.5 |
| 5,295,350 | 3/1994 | Child et al. ............................. 60/39.12 |
| 5,342,702 | 8/1994 | MacGregor . |
| 5,388,395 | 2/1995 | Scharpf et al. ......................... 60/39.12 |
| 5,421,166 | 6/1995 | Allam et al. . |
| 5,459,994 | 10/1995 | Drnevich . |
| 5,582,029 | 12/1996 | Occhialini et al. . |
| 5,724,805 | 3/1998 | Golomb et al. . |

*Primary Examiner*—Charles G. Freay
*Attorney, Agent, or Firm*—Foley & Lardner

[57] ABSTRACT

A method of generating power with sequestration of carbon-dioxide emission includes compressing ambient air, separating substantially pure oxygen from the ambient air and then further compressing the substantially pure oxygen separated from the ambient air. After the oxygen has been further compressed, the oxygen is divided into a first oxygen stream and a second oxygen stream. The method includes introducing the first oxygen stream and a solid fuel, such as coal, into a solid-fuel gasifier for converting the first oxygen stream and the solid fuel into a combustible gas and combusting the gas in the presence of the second oxygen stream, the combusting step including the step of introducing water into the combustor during the combusting step for generating an exhaust stream of carbon dioxide and steam. The exhaust stream of carbon dioxide and steam is then passed through a turbine for driving the turbine and generating power. The exhaust stream is then cooled for producing carbon dioxide gas and water so that the carbon dioxide gas may be separated from the water and collected. Introducing water into the combustor during the combusting step increases the mass flow and the volume flow of the exhaust stream passing through the turbine, thereby elevating the amount of power generated by the turbine.

21 Claims, 3 Drawing Sheets

SOLID-FUELED POWER GENERATION SYSTEM WITH CARBON DIOXIDE SEQUESTRATION AND METHOD THEREFOR

The present application claims benefit under 35 U.S.C. Section 20 of U.S. Provisional Application Ser. No. 60/096,230 filed Aug. 12, 1998, the disclosure of which is hereby incorporated by reference herein.

BACKGROUND OF THE INVENTION

1. Field of the Invention

The present invention relates to power generation and more specifically relates to a solid-fueled power system which provides for complete carbon dioxide recovery and methods therefor.

2. Brief Description of the Prior Art

The growing concern regarding global climate change has prompted the world community to implement strategies for reducing the emission of so-called greenhouse gases. Carbon dioxide ($CO_2$), which is produced by all systems that burn fossil fuels, is the most important species in this category. Emissions of carbon dioxide are particularly high for systems which use solid fuels such as coal. One solution for addressing this problem is to increase the energy conversion efficiency of fossil-fueled power plants. Another longer-term strategy which is receiving serious support from the international community, in general, and the U.S. Department of Energy, in particular, consists of sequestering and capturing the $CO_2$ emitted from fossil fueled systems (hereinafter referred to as "$CO_2$ capture"). $CO_2$ capture is typically accomplished by treating the exhaust stream to separate out the $CO_2$ component in a form suitable for removal and storage. In conventional systems, this is difficult to achieve because of the low concentration of $CO_2$ compared to the other components (namely, nitrogen) in the exhaust. The result is a process that is both costly and energy intensive.

U.S. Pat. No. 5,724,805 to Golomb et al. discloses a power plant including an air separation unit arranged to separate oxygen from air and produce a stream of oxygen and a gas turbine for combusting a fuel, such as natural gas, in the presence of the oxygen. The power plant includes a carbon dioxide removal unit arranged to recover carbon dioxide gas from the exhaust gas, recycle a portion of the recovered carbon dioxide gas for passage through the gas turbine, and liquefy the remainder of the recovered carbon dioxide gas for removal from the plant. As disclosed in the '805 patent, a portion of the $CO_2$ gas leaving the turbine is recovered from the $CO_2/H_2O$ exhaust stream, recycled to the inlet of the compressor and recompressed. The compression of the $CO_2$ gas prior to recycling requires a significant amount of energy, thereby minimizing the overall efficiency of the system.

Thus, there is a need for a more efficient solid-fueled cogeneration system which overcomes the above-described problems.

SUMMARY OF THE INVENTION

In accordance with one preferred embodiment of the present invention, a method of generating power with sequestration of carbon-dioxide emission may include the steps of compressing ambient air and then separating substantially pure oxygen from the compressed ambient air using an air separator. The substantially pure oxygen separated from the ambient air may then be further compressed. The air separator used to separate the oxygen from the ambient air may also be used to separate nitrogen from the compressed ambient air. The separated nitrogen may be vented to atmosphere or may be processed for recovering energy therefrom, such as by passing the compressed nitrogen through a turbine.

After the substantially pure oxygen has been further compressed, the oxygen may be divided into a first oxygen stream and a second oxygen stream. In certain embodiments, the second oxygen stream has a larger flow volume than the first oxygen stream. The first oxygen stream and a solid fuel are then introduced into a solid-fuel gasifier for converting the first oxygen stream and the solid fuel into a combustible gas. The solid fuel is preferably selected from the group consisting of coal and biomass. The combustible gas may then be filtered to remove particulate matter and/or contaminants therefrom.

The combustible gas may then be combusted in the presence of the second oxygen stream. The combusting step may include the step of introducing water into the combustor for generating an exhaust stream of carbon dioxide and steam. The introduction of water during combustion increases, inter alia, the total volume flow of the carbon dioxide and steam. The introduction of water may also reduce the maximum temperature within the combustor. This is beneficial because the combustion of solid fuel in substantially pure oxygen yields a much higher temperature than combustion in ambient air. While the higher temperatures improve the thermodynamic efficiency of the system, present materials used in combustors and turbines may be unable to survive at these high temperatures.

The carbon dioxide and steam may then be passed through a turbine for driving the turbine and generating power. The turbine preferably drives a rotatable shaft which, in turn, is connected to the compressors and to a generator for producing electrical power. In other words, rotation of the turbine drives the compressors and the generator for producing electrical power. The introduction of water into the combustor during the combusting step also preferably increases the total mass flow and volume flow of the exhaust stream passing through the turbine, thereby elevating the amount of power generated by the turbine.

After the exhaust stream passes through the turbine for generating power, the turbine exhaust stream is cooled, preferably in a condenser, for producing carbon dioxide gas and liquid water. The carbon dioxide gas may then be separated from the liquid water so that the carbon dioxide gas does not escape back into the atmosphere as a green house gas. The carbon dioxide gas separated from the cooled turbine exhaust stream may be collected and stored in storage vessels or disposed of by any one of several different processes presently under consideration for long-term sequestration, such as deep ocean storage. As the turbine exhaust stream passes through the condenser, the heat present in the turbine exhaust stream may be recovered for reuse as waste heat or to generate steam for additional energy recovery.

The water separated from the turbine exhaust stream may be recycled and directed to the combustor for serving as the water introduced into the combustor during the combusting step. The water is preferably re-pressurized in a pump prior to being introduced into the combustor. In certain embodiments, the method of generating power may also include adding an additional amount of make-up water to the recycled water being directed to the combustor. The make-up water is generally added to the recycled water before the water is re-pressurized in the pump.

In yet further embodiments, the method may include spraying a stream of the water into the combustible gas before the filtering step for reducing the temperature of the combustible gas.

Other embodiments of the present invention provide a power generating system with sequestration of carbon-dioxide emission including a first compressor for compressing ambient air; an air separation unit downstream from the first compressor for separating substantially pure oxygen from the compressed ambient air; and a second compressor downstream from the air separation unit for further compressing the substantially pure oxygen. The power generating system preferably includes conduit, such as tubes or ducts, for dividing the substantially pure oxygen into a first oxygen stream and a second oxygen stream. The system includes a gasifier designed for receiving the first oxygen stream and a solid fuel (e.g., coal) therein for converting the first oxygen stream and the solid fuel into a combustible gas.

The power generating system may also include a combustor adapted for combusting the combustible gas in the presence of the second oxygen stream and water for generating an exhaust stream including primarily carbon dioxide and steam. The power generating system may also include a turbine downstream from the combustor through which the exhaust stream passes for driving the turbine and generating power. A condenser located downstream from the turbine preferably cools the turbine exhaust stream so as to produce carbon dioxide gas and liquid water. The condenser may include coils and tubing for separating the carbon dioxide gas from the water, wherein introducing water into the combustor during combustion of the combustible gas increases the mass flow and volume flow of the exhaust stream passing through the turbine for elevating the amount of power generated by the turbine.

The power generating system may also include a pump for pressurizing the water present in the cooled turbine exhaust stream after the carbon dioxide gas has been separated from the exhaust stream and tubing for directing the pressurized water back to the combustor so as to introduce the pressurized water into the combustor. The system may also be connected to a source of additional make-up water so as to supply additional water to the recycled water present in the cooled turbine exhaust stream. The make-up water is preferably added to the recycled water before the water is re-pressurized by the pump.

In certain preferred embodiments, the system may include a filter between the solid-fuel gasifier and the combustor for filtering the combustible gas so as to remove particulate and/or contaminants therefrom.

Other objects, advantages and features of the present invention will be readily apparent to one skilled in the art from the following detailed description of preferred embodiments when taken in conjunction with the accompanying drawings showing certain preferred embodiments of the present invention.

DETAILED DESCRIPTION OF PREFERRED EMBODIMENTS

Figure 1:
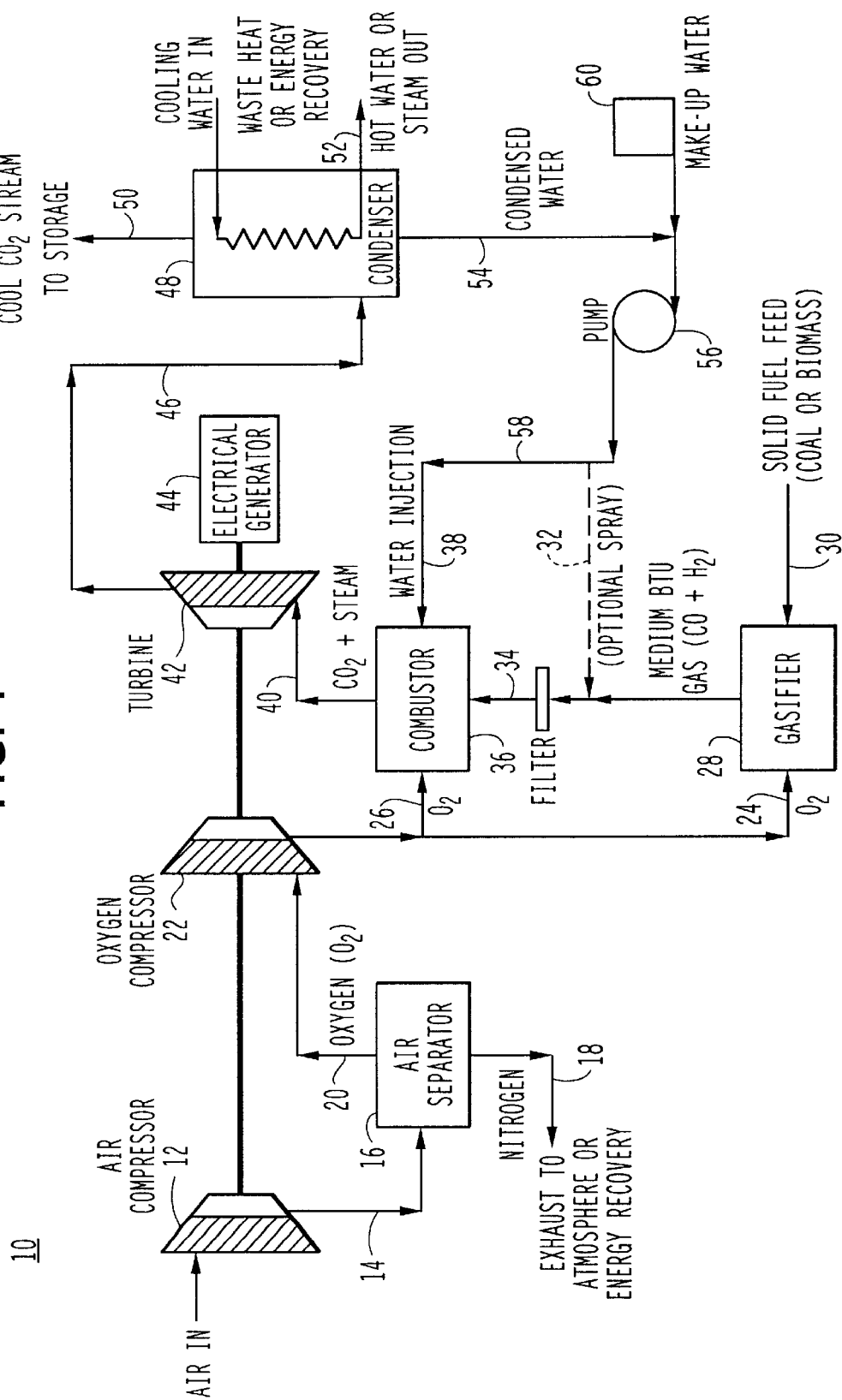
FIG. 1 shows a schematic drawing of a solid-fueled power generation system with carbon dioxide sequestration, the system including a single-shaft arrangement, in accordance with one preferred embodiment of the present invention.

FIG. 1 shows a power generation system with carbon dioxide sequestration in accordance with certain preferred embodiments of the present invention. The power generation system shown in FIG. 1 preferably includes a cogeneration system 10 having a solid-fueled Brayton cycle with waste heat recovery. The power system 10 includes a first compressor 12 for compressing ambient air. The compressed ambient air is then directed downstream via line 14 to an air separation unit 16 wherein the compressed air is separated into two streams including nitrogen directed downstream in line 16 and oxygen directed downstream in line 20 to a second compressor 22. Although the air separation unit 16 may separate the compressed ambient air by various processes, in preferred embodiments the compressed ambient air is preferably separated using membrane separation, cryogenic air liquefaction or pressure swing adsorption (PSA) techniques. Once the nitrogen has been separated from the ambient air, the nitrogen may be directly vented or exhausted to the atmosphere or be directed through an expander (not shown) for recovering any available energy therefrom.

The power generation system 10 also includes the second compressor 22 located downstream from the first compressor 12 for further compressing the substantially pure oxygen which has been separated from the compressed ambient air. The compressed oxygen discharged from the second compressor 22 is then separated into a first oxygen stream via line 24 and a second oxygen stream via line 26, preferably using conduits, such as tubes or ducts, for dividing the substantially pure oxygen. The power generation system 10 also preferably includes a gasifier 28 designed for receiving the first oxygen stream via line 24 and a solid fuel, such as coal or biomass, via line 30 for converting the first oxygen stream and the solid fuel into a combustible gas. In preferred embodiments, the gasifier 28 is an oxygen-blown gasifier capable of generating a medium-Btu gas from the supply of the solid fuel.

In certain preferred embodiments, the power generation system 10 includes a spraying element 32 for spraying a small stream of water into the gas discharged from the gasifier 28. The water vaporizes and provides partial cooling of the gas before it flows through a filter 34 for removal of particulates, thereby eliminating the necessity of using filter materials capable of withstanding high temperatures.

After the combustible gas has been filtered for removing particulates therefrom, the gas is directed downstream via line 34 to a combustor 36. The combustor 36 is adapted for combusting the combustible gas in the presence of both the second oxygen stream supplied via line 26 and water introduced into the combustor via line 38, thereby generating an exhaust stream discharged via line 40 comprising essentially carbon dioxide and steam. Injecting the water into the combustor via line 38 serves at least two very important purposes. First, the water serves as a diluent for reducing the maximum temperature within the combustor, which may be undesirably high due to the presence of pure oxygen, thereby leading to structural cooling problems. Secondly, the introduction of water provides additional mass flow to boost the power generating capacity of the cycle. The power generating system 10 also includes a turbine 42 located downstream from the combustor 36 adapted for passing the exhaust stream from the combustor therethrough for driving the turbine 42. In turn, the turbine 42 is connected to and drives the compressor and a generator 44 for generating electrical power.

After passing through the turbine 42, the carbon dioxide and steam is directed via line 46 to a condenser 48. The condenser 48 preferably cools the turbine exhaust stream so as to produce carbon dioxide gas and liquid water. The carbon dioxide separated from the turbine exhaust is directed downstream via line 50 for utilization or storage. The condenser 48 may also include a heat recovery element 52 for recovering waste heat from the turbine exhaust stream. As shown in FIG. 1, the heat recovery element 52 includes passing cooling water in close communication with the turbine exhaust for transferring heat from the exhaust to the water, thereby generating hot water or steam which is discharged from the condenser 48 via line 52. The waste heat may be used for many purposes including generating heat for direct use or generating pressurized steam for energy recovery in a steam bottoming cycle. The condensed water removed from the turbine exhaust stream is preferably recycled via line 54 so that it may be used as the source of water injected into the combustor via line 38 and/or sprayed into the gas stream by spraying element 32.

The power generating system 10 may also include a pump 56 for repressurizing the condensed water separated from the turbine exhaust stream. After the water has passed through the pump 56, the re-pressurized water is directed back to the combustor 36 via line 58. The power generating system 10 may also be connected to an additional source of water 60 (e.g., "make-up water") so as to provide additional water to be added to the condensed water removed from the turbine exhaust stream to make up for any water lost from the system. The "make-up water" is preferably added to the condensed water before the latter is re-pressurized by the pump.

Figure 2:
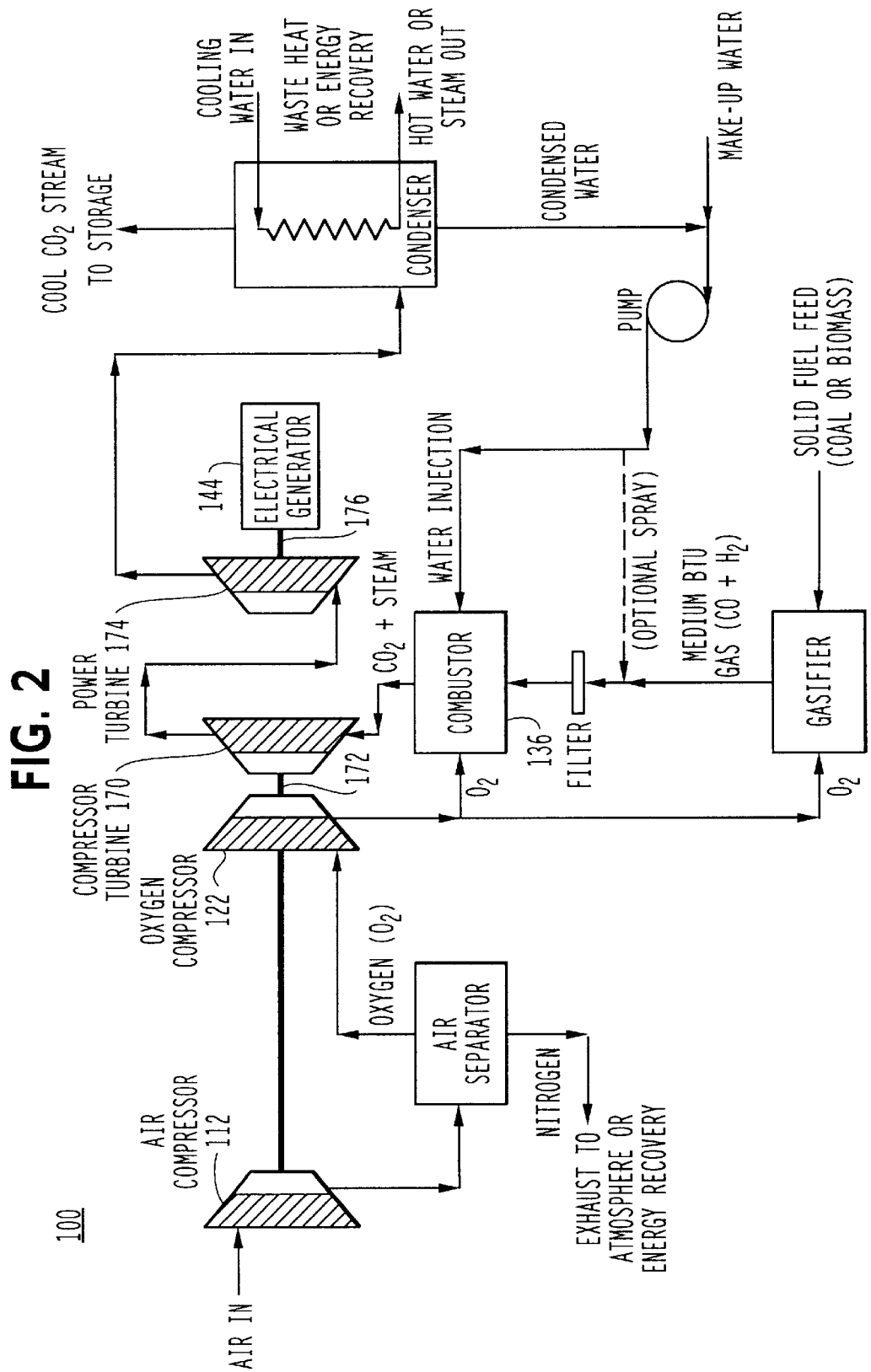
FIG. 2 shows a schematic drawing of a solid-fueled power generation system with carbon dioxide sequestration, the system including a two-shaft arrangement, in accordance with other preferred embodiments of the present invention.

FIG. 2 shows a power generation system with carbon dioxide sequestration in accordance with other preferred embodiments of the present invention wherein the system 100 comprises a two shaft configuration. As shown in FIG. 2, a compressor turbine 170 is connected to a first shaft 172 for driving air compressor 112 and oxygen compressor 122. During operation, the exhaust stream from combustor 136 passes through compressor turbine 170 which drives the first shaft 172. In turn, rotation of the first shaft 172 drives air compressor 112 and oxygen compressor 122. After exiting the compressor turbine 170, the exhaust stream is directed downstream for passing through a power turbine 174 connected to a second shaft 176. As the exhaust stream passes through the power turbine 174, the second shaft 176 is rotated for driving electrical generator 144.

Figure 3:
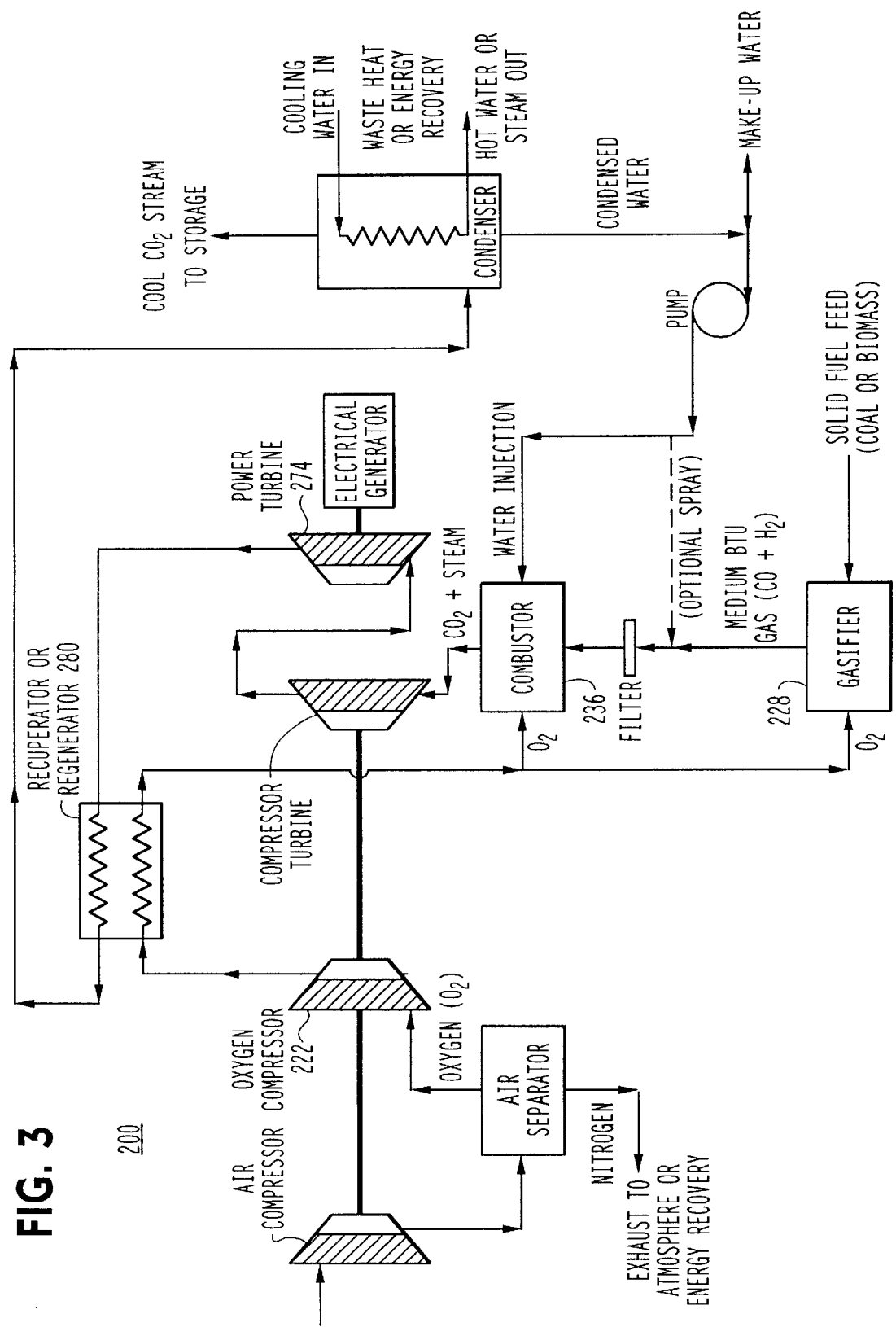
FIG. 3 shows a schematic drawing of a solid-fueled power generation system with carbon dioxide sequestration, the system including a recuperator pr regenerator for recovering energy, in accordance with further preferred embodiments of the present invention.

FIG. 3 shows a power generation system with carbon dioxide sequestration in accordance with still further preferred embodiments of the present invention wherein the system 200 includes a recuperator or regenerator 280, such as the recuperator disclosed in commonly assigned, copending U.S. patent application Ser. No. 08/792,261 filed Jan. 1, 1997 and entitled "Unit Construction Plate-Fin Heat Exchanger." The exhaust stream exiting power turbine 274 is directed through the recuperator 280 so that the exhaust stream may pass closely by the compressed oxygen stream leaving the oxygen compressor 222. As the exhaust stream passes closely by the compressed oxygen stream, energy, in the form of heat, is transferred from the exhaust stream to the compressed oxygen stream. As a result, the temperature of the oxygen entering combustor 236 and gasifier 228 is higher which ultimately improves the overall efficiency of the system 200.

It will therefore be readily understood by those skilled in the art that the present invention may be used for a broad array of functions and applications and that many embodiments and adaptions of the present invention, other than those described herein, will be apparent from or reasonably suggested by the foregoing description without departing from the substance or scope of the present invention. Accordingly, while the present invention has been described in relation to its preferred embodiment, it is to be understood that this disclosure is only illustrative and exemplary of the present invention and is made merely for purposes of providing a full and enabling disclosure. The foregoing is not intended or to be construed to limit the present invention or otherwise to exclude any such other embodiments, adaptions, variations, modifications and equivalent arrangements, the present invention being limited only by the claims appended hereto and the equivalents thereof.

What is claimed is:

1. A method of generating power with sequestration of carbon-dioxide emission comprising the steps of:

compressing ambient air;

after the compressing step, separating substantially pure oxygen from the ambient air;

further compressing the substantially pure oxygen separated from the ambient air;

after the further compressing step, dividing the substantially pure oxygen into a first oxygen stream and a second oxygen stream;

introducing said first oxygen stream and a solid fuel into a solid-fuel gasifier for converting said first oxygen stream and said solid fuel into a combustible gas;

combusting said gas in the presence of said second oxygen stream at a flame temperature, the combusting step including the step of introducing water into said combustor during the combusting step for generating an exhaust stream of carbon dioxide and steam;

passing said exhaust stream of carbon dioxide and steam through a turbine for driving said turbine and generating power;

after the passing said exhaust stream through the turbine step, cooling said turbine exhaust stream for producing carbon dioxide gas and water; and separating said carbon dioxide gas from said water, wherein the step of introducing water into said combustor during the combusting step increases the mass flow and volume flow of said exhaust stream passing through said turbine for elevating the amount of power generated by said turbine.

2. The method as claimed in claim 1, wherein the step of introducing water into the combustor during the combusting step reduces the maximum temperature within the combustor.

3. The method as claimed in claim 1, further comprising the steps of compressing the water present in said cooled turbine exhaust stream after the carbon dioxide gas has been separated therefrom and directing said compressed water to said combustor for introducing said water into said combustor during the combusting step.

4. The method as claimed in claim 3, further comprising the step of adding additional water to the water present in the cooled turbine exhaust stream before the compressing the water step.

5. The method as claimed in claim 1, further comprising the step of filtering said combustible gas produced in said solid-fuel gasifier for removing particulate matter therefrom.

6. The method as claimed in claim 5, wherein the filtering said combustible gas step precedes the combusting step.

7. The method as claimed in claim 6, wherein the combusting step includes the step of introducing said filtered combustible gas and said second oxygen stream into said combustor.

8. The method as claimed in claim 1, wherein the cooling step includes the step of passing said turbine exhaust stream through a condenser for recovering heat present in said turbine exhaust stream.

9. The method as claimed in claim 1, further comprising the step of spraying a stream of the water into the combustible gas before the filtering step for reducing the temperature of said combustible gas.

10. The method as claimed in claim 1, further comprising the step of separating nitrogen from the ambient air after the compressing ambient air step.

11. The method as claimed in claim 10, further comprising the step of recovering energy from the compressed nitrogen.

12. The method as claimed in claim 10, further comprising the step of venting said compressed nitrogen to atmosphere.

13. The method as claimed in claim 1, wherein said solid fuel includes coal.

14. The method as claimed in claim 1, wherein said solid fuel includes biomass.

15. The method as claimed in claim 1, further comprising the step of collecting the carbon dioxide separated from said cooled turbine exhaust stream.

16. The method as claimed in claim 15, wherein the collecting step includes the step of storing said carbon dioxide separated from said cooled turbine exhaust stream.

17. A power generating system with sequestration of carbon-dioxide emission comprising:

a first compressor for compressing ambient air;

an air separation unit downstream from the first compressor for separating substantially pure oxygen from the compressed ambient air;

a second compressor downstream from the air separation unit for further compressing the substantially pure oxygen;

means downstream from the second compressor for dividing the substantially pure oxygen into a first oxygen stream and a second oxygen stream;

a gasifier adapted for receiving the first oxygen stream and a solid fuel therein for converting said first oxygen stream and said solid fuel into a combustible gas;

a combustor adapted for combusting said combustible gas in the presence of said second oxygen stream and water for generating an exhaust stream including carbon dioxide and steam;

a turbine downstream from said combustor adapted for passing said exhaust stream therethrough for driving said turbine and generating power;

a condenser downstream from said turbine for cooling said turbine exhaust stream so as to produce carbon dioxide gas and water, said condenser including means for separating said carbon dioxide gas from said water, wherein introducing water into said combustor during combustion of said combustible gas increases the mass flow and volume flow of said exhaust stream passing through said turbine for elevating the amount of power generated by said turbine.

18. The system as claimed in claim 17, wherein introducing water into said combustor during combustion of said combustible gas reduces temperatures within said combustor.

19. The system as claimed in claim 18, further comprising a pump for pressurizing the water present in said cooled turbine exhaust stream after the carbon dioxide gas has been separated therefrom and means for directing said pressurized water to said combustor for introducing said pressurized water into said combustor.

20. The system as claimed in claim 19, further comprising means upstream of the pump for adding additional water to the water present in the cooled turbine exhaust stream before the compressing the water step.

21. The system as claimed in claim 17, further comprising a filter between the solid-fuel gasifier and the combustor for filtering said combustible gas so as to remove particulate matter therefrom.

* * * * *